United States Patent [19]

Barber

[11] 3,722,830
[45] Mar. 27, 1973

[54] HELICOPTER TYPE VEHICLE
[76] Inventor: Gerald L. Barber, 364 Mona Lane, Findlay, Ohio 45840
[22] Filed: Feb. 12, 1971
[21] Appl. No.: 114,987

[52] U.S. Cl. ............................................. 244/17.23
[51] Int. Cl. ............................................... B64c 27/10
[58] Field of Search ..................... 244/17.11–17.27, 244/4

[56] References Cited

UNITED STATES PATENTS

| 2,551,455 | 5/1951 | Neale | 244/17.11 |
| 2,563,047 | 8/1951 | Kisner | 244/17.11 X |
| 3,018,984 | 1/1962 | Le Beau Rust | 244/17.19 |
| 2,936,971 | 5/1960 | Holmes | 244/17.21 |
| 2,156,334 | 5/1939 | De Bothezat | 244/17.23 |

Primary Examiner—Milton Buchler
Assistant Examiner—Paul E. Sauberer
Attorney—Melvin A. Crosby

[57] ABSTRACT

The invention discloses a helicopter type vehicle having coaxial counter rotating propellers above the cabin of the vehicle, each propeller being fixed in pitch as opposed to conventional helicopter propellers which vary in pitch during rotation of the propeller. The counter rotating propellers provide lift for lifting the vehicle from the surface, and forward thrust on the vehicle is developed by shifting the center of gravity of the vehicle to tilt the axis of rotation of the propellers with the shifting of the center of gravity of the vehicle being accomplished in at least one instance, by mounting the propeller drive motors adjacent the respective propellers and rotating the motors bodily about the axis of rotation of the propellers.

6 Claims, 5 Drawing Figures

Patented March 27, 1973 3,722,830
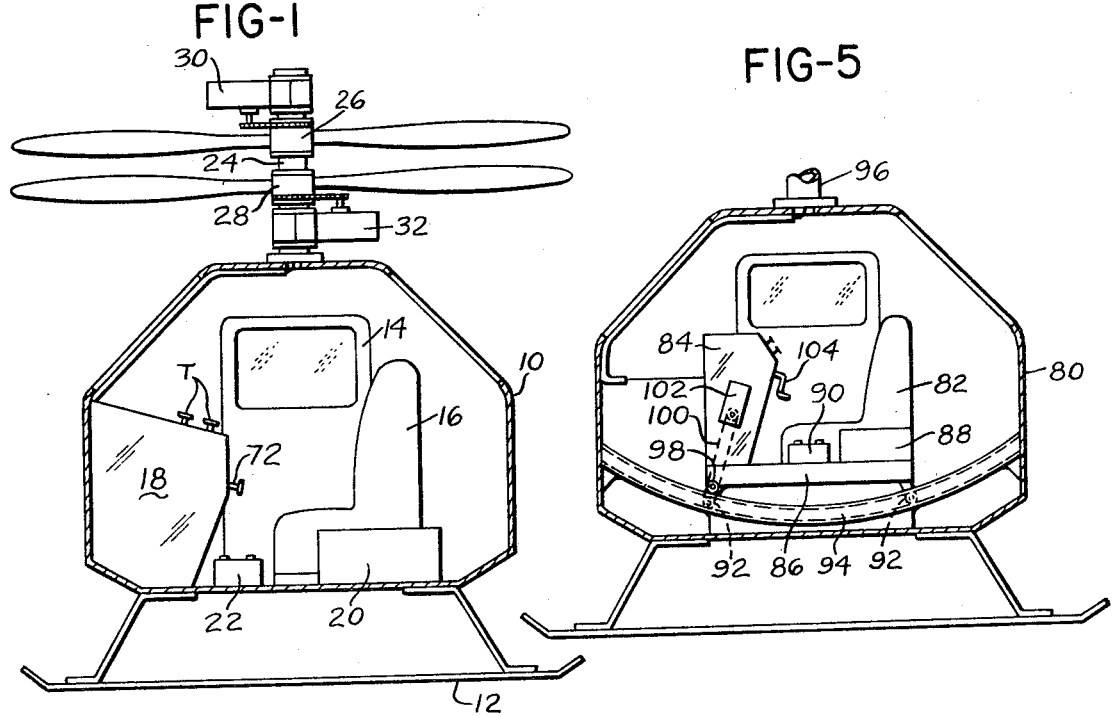
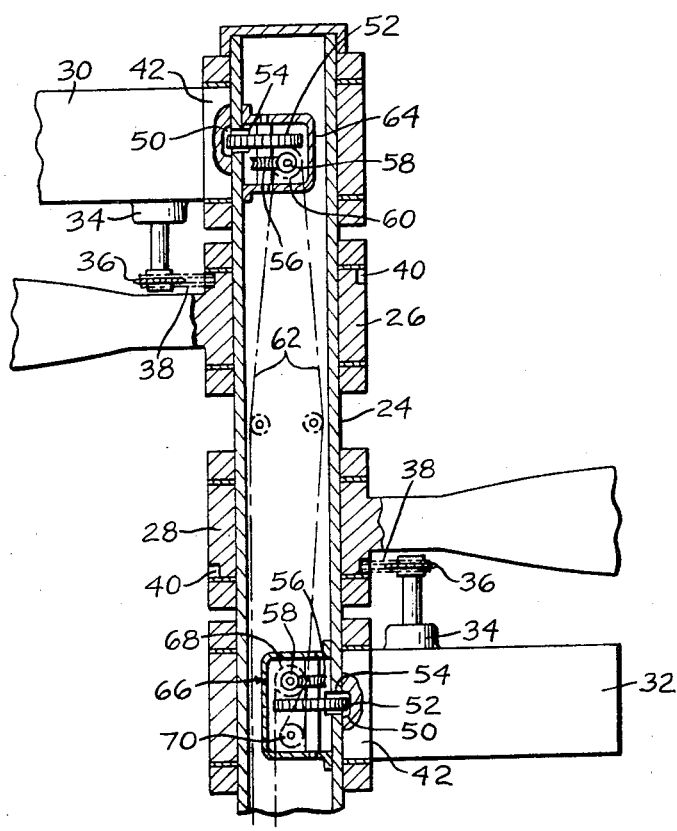
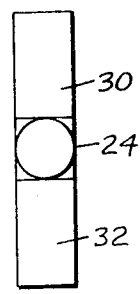
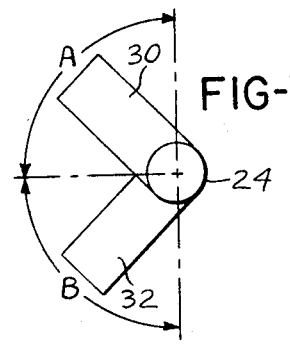
INVENTOR.
GERALD L. BARBER

HELICOPTER TYPE VEHICLE

The present invention relates to helicopter type vehicles and is particularly concerned with a vehicle of this nature in which simple propellers can be employed as opposed to the conventional helicopter propeller which varies in pitch as it rotates.

Helicopter type vehicles are known but, heretofore, the only successful ones have had propellers which vary in pitch more or less continuously as the propeller rotates in order to develop horizontal thrust on the vehicle in addition to the lift thrust developed by the propellers. Such propellers are extremely complex and expensive and require a great deal of expensive service to maintain the vehicle in safe and proper operating condition.

With the foregoing in mind, a primary objective of the present invention is the provision of a helicopter type vehicle which eliminates the usual expensive adjustable pitch helicopter type propeller.

Another object of this invention is the provision of a helicopter type vehicle which is extremely simple in construction and, therefore, substantially trouble free.

It is also an object of this invention to provide a helicopter type vehicle which, although simple in construction, can readily be maneuvered for taking off, landing, for forward flight, and for rotation to change the direction of flight.

These and other objects and advantages of the present invention will become more apparent upon reference to the following detailed specification taken in connection with the accompanying drawings in which:

FIG. 1 is a more or less schematic view showing a helicopter type vehicle constructed according to the present invention;

FIG. 2 is a schematic plan view looking down on top of the column, or post, on which the propellers are rotatable showing the engines in position for vertical lift of the vehicles;

FIG. 3 is a view like FIG. 2 but shows the engines swung in the forward direction of the vehicle to tilt the vehicle and develop forward thrust thereon;

FIG. 4 is a fragmentary vertical section taken through the column, or post, on which the propellers are rotatably mounted showing one arrangement for adjusting the engines angularly about the axis of the post; and FIG. 5 is a more or less schematic view showing a different manner of tilting a vehicle according to the present invention to control the forward thrust thereon.

BRIEF SUMMARY OF THE INVENTION

The present invention is concerned with a helicopter type vehicle having coaxial counter rotating propellers mounted on a post extending upwardly from the top of the vehicle. The propellers have independent engines so that they can be driven at the same or at different speeds. When the vehicle is vertical, the propellers develop vertical thrust on the vehicle, but when the vehicle is tilted to incline the axis of the post to the vertical, the propellers will not only develop vertical thrust on the vehicle, but will also develop horizontal thrust thereon.

The shifting of the center of gravity of the vehicle to vary the tilt of the post on which the propellers are rotatable can be accomplished by mounting the propeller drive engines on the post in a cantilevered manner and rotating the engines bodily about the axis of the post, or some other adjustment of the weight distribution of the vehicle can be made, as by movement of the structure inside the cabin, including the pilot's seat and the control panel and like auxiliaries.

DETAILED DESCRIPTION OF THE INVENTION

Referring to the drawings somewhat more in detail, the vehicle shown in FIG. 1 comprises a cabin 10 having support means thereon such as skids 12. Cabin 10 is provided with an access door 14 and inside the cabin is a seat 16 and a control panel, or console, 18. The space beneath the seat may advantageously be employed for fuel tank 20 and a battery 22 and other auxiliaries.

Fixed to and extending upwardly from the top of cabin 10 is a column, or post, 24 having rotatably mounted thereon propellers 26 and 28. Propeller 26 has a drive engine 30 and propeller 28 has a drive engine 32. The engines may be connected through gear box and centrifugal clutch means 34 with an output sprocket 36 drivingly connected by chain 38 with the drive sprocket 40 on the respective propeller hub. Overrunning clutches may be provided between the engines and the propellers, or the centrifugal clutches can provide this function.

Each of the said engines is mounted on a collar 42 journaled on the post for rotation about the central axis thereof. As will be seen in FIG. 1, each engine is cantilevered outwardly from post 24 and thus has a center of gravity disposed a substantial radial distance from the central axis of the post. Thus, by turning collars 42 about the axis of post 24, the center of gravity of the vehicle can be shifted thereby to cause the axis of post 24 to incline to the vertical. The collars 42 and the propeller hubs may be located on post 24 between thrust collars and bearings may be provided between relatively rotating parts according to conventional practices.

The speed of each of the engines is adapted for being controlled by a respective one of throttle elements T, and the engines drive the propellers 26 and 28 in counter rotation. By controlling the relative speed of the engines, the cabin 10 of the vehicle can be caused to remain oriented in one direction, or caused to turn in one direction or the other depending upon the adjustment of the individual throttle elements T.

The engines 30 and 32 have one extreme rearward position, as shown in FIG. 2, where they are substantially opposed to each other on opposite sides of the axis of column 24 and, when the engines are in this position, the axis of column 24 is substantially vertical. To tilt column 24 in the forward direction to cause the propellers to develop forward thrust on the vehicle, the engines are swung forwardly about the axis of post 24, as shown in FIG. 3.

Each engine is moveable through a range of about 90 degrees between that position where the axis of post 24 is vertical to that position where the axis of post 24 is inclined forwardly the maximum amount. For example, engine 30 might be moveable through the angle A, while engine 32 might be moveable through the angle B. While the engines are shown as moveable through angles of 90°, greater movement, even up to 180° is possible.

Various mechanisms can be employed for adjusting the positions of the engines about the axis of column 24 and one way in which this can be accomplished is shown in FIG. 4. In FIG. 4, the collar 42 for engine 30 is provided with internal teeth 50 which are engaged by a gear 52 which is disposed inside column 24 while projecting through a slot 54 formed in the column.

Fixed to gear 52 is a wormwheel 56 engaged by a worm 58 which, in turn, has a sprocket 60 connected thereto and about which a chain 62 is entrained. A housing 64 is provided, in which gears 52 and 56 and wormwheel 58 are journaled to form a unit, with sprocket 60 arranged outside one wall of the housing.

Associated with collar 42 of motor 32 is a similar adjusting unit, generally indicated by reference numeral 66, and having an input sprocket 68 corresponding to sprocket 60 of the unit described above.

Chain 62 is also entrained about sprocket 68 and, in order to get an ample wrap of the chain about sprocket 68, an idler 70 can be availed of.

The adjusting devices for the engines are so arranged that movement of chain 62 will cause the engines to swing in unison and in respectively opposite directions toward and away from the extreme positions thereof and in equal amounts. Individual adjustment of the engines is not required and, therefore, the single chain 62 is adequate for adjusting both thereof. The worm and wheel drive in each adjusting unit is self locking as well as providing mechanical advantage.

Chain 62 advantageously leads into the cabin, or an actuating mechanism for the chain leads into the cabin, to control panel, or console, 18 and is therein connected to an adjusting lever 72 so that all the controls for the vehicle are conveniently situated before seat 16.

FIG. 5 shows a modified arrangement wherein the vehicle has a cabin 80 within which is a seat 82 and a control console 84. These members may be mounted on a platform 86 which is also availed of for supporting fuel tank 88 and battery 90 and other auxiliaries.

The particular feature of the FIG. 5 arrangement is that the platform 86 and the parts carried thereby are supported on rollers 92, guided in track 94, so as to be shiftable forwardly and backwardly in cabin 80, thereby to shift the center of gravity of the vehicle, thus controlling the tilting of the post 96 extending upwardly from the top of the cabin and on which the propellers are rotatably mounted.

Advantageously, a rotary drive member 98 is provided engaging the track and adapted for being driven by a chain 100 which derives power from the output sprocket of self-locking drive 102 having a manually operable input crank 104.

Track 94 may be curved, as illustrated, or it can be straight. When curved track 94 supports seat 82 so the occupant thereof is substantially upright at all times.

It will be evident that the possibility presents itself of tilting the entire cabin of the vehicle relative to the post on which the propellers rotate because this, also, would bring about a shifting of the load on the vehicle in such a manner as to cause the post to tilt relative to the vertical.

The vehicle according to the present invention is extremely simple and inexpensive, especially since the propellers employed can be of fixed pitch as opposed to the conventional extremely complex propellers employed on conventional helicopter type vehicles.

While it is mentioned that the propellers are of fixed pitch, the possibility of adjustable pitch propellers is not precluded, but it is not necessary for the propellers to vary in pitch continuously during rotation thereof.

Modifications may be made within the scope of the appended claims.

What is claimed is:

1. In a helicopter type vehicle: a cabin, a post extending vertically upwardly from the cabin and having the axis thereof on a line which is near the center of gravity of the vehicle under conditions of normal load on the vehicle, a pair of propellers rotatable on said post and operable when rotated to develop thrust in a direction substantially parallel to the axis of said post, engine means for driving the propellers in respectively opposite directions, each engine being adjacent the respective propeller, support means supporting each engine on said post in a position such that the center of gravity of the respective engine is displaced radially from the axis of said post, and means for rotating said support means on said post for shifting the center of gravity of said vehicle in the fore and aft direction to tilt the vehicle relative to the vertical and thereby to control horizontal thrust developed on said vehicle by said propellers.

2. A helicopter type vehicle according to claim 1 which includes control means interconnecting said support means for simultaneous rotation on said post in respectively opposite directions.

3. A helicopter type vehicle according to claim 2 in which said control means is arranged to cause said support means to rotate equal angles on said post, whereby the centers of gravity of said engines are always substantially coplanar in the transverse direction of said vehicle.

4. A helicopter type vehicle according to claim 2 in which said engines are moveable by rotation of the said support means therefor from a first rearwardmost position wherein the centers of gravity of the engines are so disposed that the axis of said column extended is near the center of gravity of the vehicle to a second forwardmost position wherein the centers of gravity of said engines are so disposed that the axis of said column extended is rearwardly of the center of gravity of the vehicle.

5. A helicopter type vehicle according to claim 4 in which said control means is operable to lock both of said support means in any rotated position thereof between said first and second positions.

6. A helicopter type vehicle according to claim 1 which includes means to vary the relative speeds of said engines.

* * * * *